United States Patent
Cooper

(10) Patent No.: US 8,153,328 B2
(45) Date of Patent: Apr. 10, 2012

(54) CARBON FUEL CELLS WITH CARBON CORROSION SUPPRESSION

(75) Inventor: John F. Cooper, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1301 days.

(21) Appl. No.: 11/879,568

(22) Filed: Jul. 17, 2007

(65) Prior Publication Data

US 2009/0023041 A1  Jan. 22, 2009

(51) Int. Cl.
*H01M 8/14* (2006.01)
*H01M 8/22* (2006.01)
*H01M 2/14* (2006.01)

(52) U.S. Cl. .................. 429/476; 429/505; 429/509

(58) Field of Classification Search ...... 29/623.1–623.5; 427/115; 429/475–476, 502–503, 505, 507–509, 429/512, 514, 516, 535
See application file for complete search history.

(56) References Cited

U.S. PATENT DOCUMENTS

| 4,125,676 | A  | * | 11/1978 | Maricle et al. ............ 429/500 |
| 6,815,105 | B2 |   | 11/2004 | Cooper et al. |
| 6,878,479 | B2 |   | 4/2005  | Cooper et al. |
| 2002/0106549 | A1 |   | 8/2002 | Cooper et al. |
| 2005/0066573 | A1 |   | 3/2005 | Cooper |
| 2006/0019133 | A1 |   | 1/2006 | Cooper |
| 2006/0029857 | A1 | * | 2/2006 | Cherepy et al. ............ 429/40 |
| 2006/0057443 | A1 |   | 3/2006 | Cooper |

* cited by examiner

*Primary Examiner* — Barbara Gilliam
*Assistant Examiner* — Claire L Roe
(74) *Attorney, Agent, or Firm* — Eddie E. Scott

(57) ABSTRACT

An electrochemical cell apparatus that can operate as either a fuel cell or a battery includes a cathode compartment, an anode compartment operatively connected to the cathode compartment, and a carbon fuel cell section connected to the anode compartment and the cathode compartment. An effusion plate is operatively positioned adjacent the anode compartment or the cathode compartment. The effusion plate allows passage of carbon dioxide. Carbon dioxide exhaust channels are operatively positioned in the electrochemical cell to direct the carbon dioxide from the electrochemical cell.

6 Claims, 3 Drawing Sheets

CARBON FUEL CELLS WITH CARBON CORROSION SUPPRESSION

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to carbon fuel cells and batteries and more particularly to carbon fuel cells and batteries with carbon corrosion suppression.

2. State of Technology

U.S. Pat. No. 6,815,105 for a fuel cell apparatus and method thereof issued to John F. Cooper et al Nov. 9, 2004 provides state of technology information. High temperature, molten electrolyte, electrochemical cells have been shown to be an efficient method of producing energy particularly when the fuel source is hydrogen gas. Carbon as a fuel source in electrochemical cells has been explored. Advantages have been found that are associated with the higher conversion efficiency and more complete utilization of the fuel, when compared with hydrogen fuel cells. The preferred electrochemical cell comprising a cathode compartment formed by a housing comprising non-porous, inert material having a gas inlet and outlet, an oxygen-containing gas, a molten electrolyte, and a cathode current collector; an anode compartment having an inlet, an anode current collector, and a slurry comprising the molten electrolyte and carbon particles entrained in the molten electrolyte; and an electron insulating, ion conducting, porous ceramic separator between the cathode compartment and the anode compartment, the porous ceramic separator capable of allowing transport of ions produced in the cathode compartment to the slurry.

U.S. Pat. No. 6,878,479 for a tilted fuel cell apparatus issued Apr. 12, 2005 to John F. Cooper et al provides the following state of technology information: "an apparatus comprising: an anode current collector; a cathode current collector; a porous ceramic separator, wherein the separator is sandwiched between the cathode current collector and the anode current collector and the anode current collector is at a higher elevation than the cathode current collector; an anode plate and rib assembly comprising a plate and a plurality of ribs, wherein the anode plate and rib assembly is positioned such that the ribs are electrically connected to the anode current collector to form a plurality of anode channels; a cathode plate and rib assembly comprising a plate and a plurality of ribs, wherein the cathode plate and rib assembly is positioned such that the ribs are electrically connected to the cathode current collector to form a plurality of cathode channels; means for entry to the anode channels of a plurality of particles, wherein the particles consist essentially of carbon, electrolyte, or mixtures thereof; means for entry of a gas containing both oxygen and carbon-dioxide to the cathode channels; means for exit of carbon dioxide gas and excess molten electrolyte from the anode channels; and means for exit of gaseous byproducts and excess molten electrolyte from the cathode channels, wherein the cell assembly is substantially planar and rectangular and tilted at an acute angle to the horizontal in a configuration such that the means of entry are positioned at a higher elevation than the means of exit and that the anode plate and rib assembly is positioned at a higher elevation than the cathode plate and rib assembly."

United States Published Patent Application No. 2006/0019133 by John F. Cooper for conversion of raw carbonaceous fuels provides the following state of technology information: "High temperature, molten electrolyte, electrochemical cells have been shown to be an efficient method of producing electrical energy particularly when the fuel source is hydrogen gas. Carbon as an anodic fuel source in electrochemical cells has been explored, and advantages were found that are associated with higher conversion efficiency and more complete utilization of the carbon anode."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides an electrochemical cell apparatus that can operate as either a fuel cell or a battery. Fuel cells are characterized by having a fixed cell hardware that is capable of consuming fuel supplied to the cell from an external source; the rated power and energy capacity of fuel cells are, by definition, fully independent parameters. Batteries, in contrast, have their electrochemical reactants supplied in advance of discharge and are limited in power and energy content simultaneously by the initial charge.

The electrochemical cell apparatus includes a cathode unit; and anode unit operatively connected to cathode unit and containing carbon fuel; an effusion plate positioned in operative position within the anode unit, the effusion plate allowing the passage of carbon dioxide; and carbon dioxide exhaust channels in the electrochemical cell in operative position with the effusion plate to direct carbon dioxide from the electrochemical cell without passing through the interior of the carbon fuel bed.

One embodiment of the present invention includes a gas-impermeable separator operatively connected to the anode unit, the effusion plate, and the cathode unit to prevent the carbon dioxide from reaching the cathode unit. One embodiment of the present invention includes electronic conductors in the carbon fuel cell section.

One embodiment of the present invention includes a cathode current collector; an anode current collector operatively connected to the cathode current collector; a carbon fuel cell unit operatively connected to the anode current collector and the cathode current collector; an effusion plate positioned adjacent the anode current collector or the cathode current collector, the effusion plate allowing the passage of the carbon dioxide; and carbon dioxide exhaust channels in the electrochemical cell positioned adjacent the anode current collector, the carbon dioxide exhaust channels operatively connected to the effusion plate to direct the carbon dioxide from the electrochemical cell. In one embodiment the anode current collector has two sides, a first side and second side, and the effusion plate is positioned on the first side of the anode current collector and the carbon dioxide exhaust channels are positioned on the second side of the anode current collector. In one embodiment the anode current collector is located above the cathode current collector. In another embodiment the anode current collector is located above the cathode current collector and the effusion plate is located between the anode current collector and the cathode current collector.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
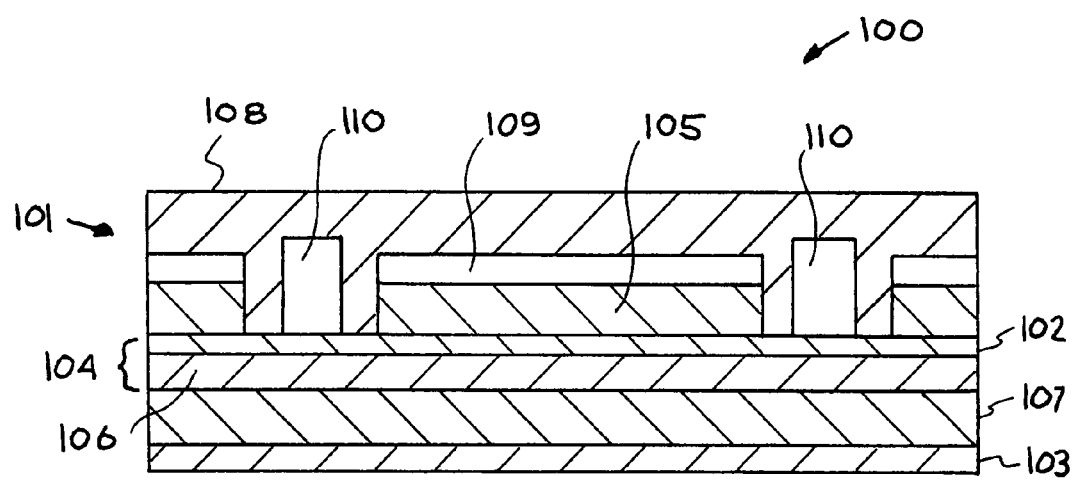
FIG. 1 illustrates one embodiment of a system of the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides an electrochemical cell that can operate as either a fuel cell or a battery. Fuel cells are characterized by having a fixed cell hardware that is capable of consuming fuel supplied to the cell from an external source; the rated power and energy capacity of fuel cells are, by definition, fully independent parameters. Batteries, in contrast, have their electrochemical reactants supplied in advance of discharge and are limited in power and energy content simultaneously by the initial charge. More information about electrochemical cells, either a fuel cell or a battery, is provided in the disclosures of United States Published Patent Application No. 2006/0019133 by John F. Cooper for conversion of raw carbonaceous fuels, United States Published Patent Application No. 2002/0106549 by John F. Cooper et al for a fuel cell apparatus and method thereof, and U.S. Pat. No. 6,878,479 issued to John F. Cooper et al for a tilted fuel cell apparatus, and U.S. Pat. No. 6,815,105 issued to John F. Cooper et al for a fuel cell apparatus and method thereof. The disclosures of United States Published Patent Application No. 2006/0019133 by John F. Cooper for conversion of raw carbonaceous fuels, United States Published Patent Application No. 2002/0106549 by John F. Cooper et al for a fuel cell apparatus and method thereof, and U.S. Pat. No. 6,878,479 issued to John F. Cooper et al for a tilted fuel cell apparatus, and U.S. Pat. No. 6,815,105 issued to John F. Cooper et al for a fuel cell apparatus and method thereof are incorporated herein by this reference.

Referring now to the drawings and in particular to FIG. 1, one embodiment of a system of the present invention is illustrated. This embodiment of a system of the present invention is designated generally by the reference numeral 100. The system 100 is an electrochemical cell that operates as a fuel cell.

Direct Carbon Conversion (DCC) fuel cells and batteries make use of carbon anodes in the form of porous plates or paste-like powders of carbon particles mixed with molten salts at 650-850 C. Near to the reacting interface, the anode reaction is typically $C+2CO_3^{2-}=3CO_2+4e^-$. This reaction yields $CO_2$ (and not CO) because the anode surface is polarized and covered with an adherent layer of R—CO functional groups that, inhibit the anodic reaction on an otherwise bare surface that would yield CO. Evolution of CO (and not $CO_2$) would cut the total electrochemical efficiency roughly in half. Far from the reacting surface, Boudouard corrosion ($C+CO_2=2CO$) takes place, reducing the total electrochemical efficiency by a factor of two.

During the refueling of a fuel cell (and the manufacture of carbon primary batteries), the fuel cell anode chamber is filled with carbon that will be reacted over an extended period of time. The reaction of the carbon in the reaction zone extending a few millimeters from the anode current collector into the bulk of the carbon produces $CO_2$. It is important that this $CO_2$ not be allowed to flow through or pass over that portion of the carbon that is not polarized. A system for exhausting the carbon dioxide from the anode chamber without flowing through the bulk of the unreacted carbon fuel is needed to bring the system to maximum efficiency. Further, some CO will invariably be produced by contacting the carbon with the $CO_2$ or by electrochemical reaction at currents below those required for polarization. A system for recovering the energy associated with the formation of CO is also helpful in achieving maximum efficiency of the cell.

As illustrated in FIG. 1, a carbon fuel cell section of assembly is shown with overlying carbon fuel chamber (comprised of a CO-gas filled cul-de-sac 109, carbon fuel paste or plate 105) separated by open channels 110 for carbon dioxide exhaust. Carbon dioxide forming near to the interface between fuel paste or plate 105 and open screen or porous anode current collector 102 flows through the anode collector 102 and a open pore ceramic gas-permeable effusion matrix 106 beneath it to the parallel channels 110. The electrochemical cell that operates as a fuel cell in the system 100 includes the following structural components: a housing 101, an anode current collector 102, a cathode catalyst supported on a porous cathode current collector 103, a porous separator system 104 (comprised of anode current collector 102 and open pore ceramic gas-permeable effusion matrix 106), a carbon fuel chamber (comprised of paste or plate 105 and a CO-filled cul-de-sac 109), an open pore ceramic gas-permeable effusion matrix 106, a gas-impervious melt filled porous separator 107, a bipolar cell transfer plate 108, and $CO_2$ exhaust channels 110.

The housing 101 of the system 100 contains an anode compartment (comprised of a CO-gas filled cul-de-sac 109 and a carbon fuel paste or plate 105), a cathode catalyst and porous current collector 103, and a porous separator system 104 (comprised of an anode current collector 102 and a open pore ceramic gas-permeable effusion matrix 106) between said anode compartment and gas-impervious porous separator saturated with melt 107. The carbon fuel chamber (comprised of carbon paste or plate fuel 105 and gas-filled cul-de-sac 109) is adjacent to open channels 110 for carbon dioxide exhaust. Carbon dioxide forming near to the interface between fuel paste or plate 105 and current collector 102 flows through porous separator system 104 to the $CO_2$ exhaust channels 110.

The system 100 utilizes placement of an open pore ceramic gas-permeable effusion matrix wetted with molten salt 106 between the carbon anode current collector 102 and the gas-impermeable separator 106. The wetted effusion plate 106 conducts ions in the molten salt between the carbon reaction zone and the gas-impermeable salt-saturated separator 107. The pores of the effusion plate connect with channels 110 exiting the cell to allow exhaust of the $CO_2$ product from the reaction zone adjacent to the separator without flow through or by the remainder of the fuel in the system.

The effusion plate 106 in the embodiment 100 is an open foam ceramic, but may be rendered electronically conductive by surface deposition of a metal or by fabrication out of metal foam, and support part of the function of the anode current collector 102, as well. The defining function of the effusion plate 106 include (A) provide an open porosity for the transport of gaseous $CO_2$ from point of origin at the carbon-electrolyte interface and (B) provide a surface wetted with molten carbonate electrolyte to complete the electrolyte circuit between the anode and the separator electrolytes.

Figure 2:
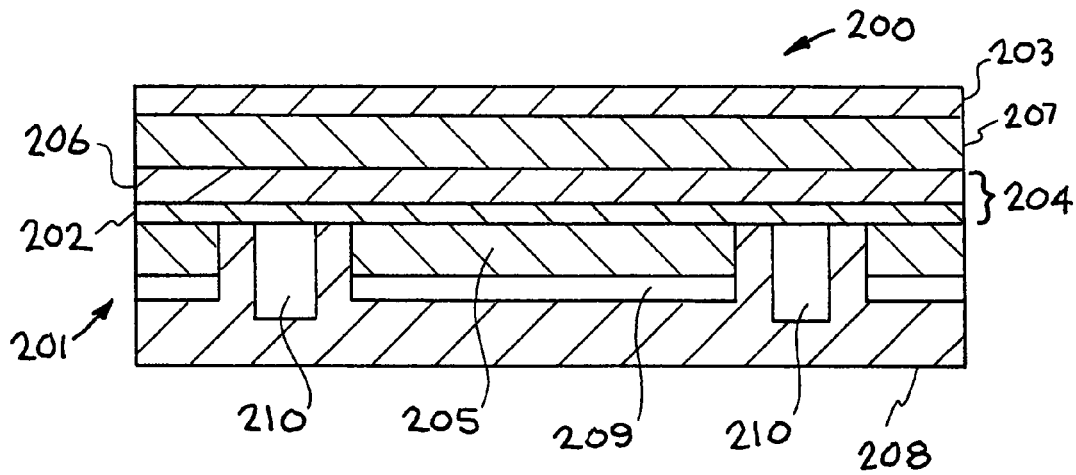
FIG. 2 illustrates another embodiment of a system of the present invention.

Referring now to FIG. 2, another embodiment of a system of the present invention is illustrated. This embodiment of a system of the present invention is designated generally by the reference numeral 200. The system 200 provides an electrochemical cell that operates as a fuel cell. Fuel cells are characterized by having a fixed cell hardware that is capable of consuming fuel supplied to the cell from an external source; the rated power and energy capacity of fuel cells are, by definition, fully independent parameters.

FIG. 2 shows carbon fuel cell section of assembly with carbon fuel chambers (comprised of carbon fuel plate or paste 205 and electrolyte-filled cul-de-sac 209) underlying the anode current collector 202, the open pore ceramic gas-permeable effusion matrix 206, and the gas-impervious separator 207. Said carbon fuel chambers are separated by $CO_2$ exhaust channels 210 that transport the carbon dioxide out of the fuel cell. Carbon dioxide forming near to the interface between fuel paste or plate 205 and anode current collector 202 flows through the porous separator system 204 (comprised of open pore ceramic gas-permeable effusion matrix 206 and anode current collector 102) to the parallel channels 209. The system 200 includes a housing 201, an anode compartment (comprised of anode fuel 205 and gas-filled cul-de-sac 209), a cathode catalyst and porous current collector 203, a porous separator system 204 (comprised of the effusion matrix 206 and the anode current collector 202), a carbon fuel chamber (comprised of carbon fuel 205 and electrolyte-filled cul-de-sac 209), a gas-impermeable salt-saturated separator 207, a bipolar cell transfer plate 208, and $CO_2$ exhaust channels 210.

The housing 201 of the system 200 contains an anode compartment (comprised of anode fuel 205 and electrolyte-filled cul-de-sac 209), a cathode catalyst and porous cathode current collector 203, and a porous separator system 204 (comprised of open pore ceramic gas-permeable effusion matrix 206 and anode current collector 202) between said anode compartment and gas-impervious porous separator saturated with molten salt 207. The carbon fuel cell section 205 of the assembly is shown with carbon compartment separated by open channels 210 for carbon dioxide exhaust. Carbon dioxide forming near to the interface between fuel paste 205 and current collector 202 flows through the collector 202 and a permeable separator 206 to the parallel exhaust channels 210.

Direct Carbon Conversion (DCC) fuel cells and batteries make use of carbon anodes in the forms (A) rigid plates and (B) paste-like powders of carbon particles mixed with molten salts. Near to the reacting interface, the anode reaction is typically $C+2CO_3^{2-}=3CO_2+4e^-$. This reaction yields $CO_2$ (and not CO) because the anode surface is polarized and covered with an adherent layer of electrosorbed R—CO functional groups inhibit the reaction on an otherwise bare surface that would yield CO. Far from the reacting surface, Boudouard corrosion ($C+CO_2=2CO$) takes place, reducing the efficiency by a factor of 2. The system 200 of the present invention includes the use of an effusion plate 206 that (A) provides a path for exhaustion of $CO_2$ from the point of its generation without contacting unpolarized regions of the fuel, and (B) provides a catalytic surface for the reaction of any entrained CO to yield electrons and $CO_2$ within the effusion matrix, thus recovering any fuel lost to CO by corrosion and entrained in the exhaust of the cell.

Referring again to FIG. 2, the electrochemical cell that operates as a fuel cell in the system 200 includes the following structural components: a housing 201, an anode current collector 202, a cathode catalyst and current collector 203, a porous separator system 204 (comprised of porous effusion matrix 206 and anode current collector 202), a carbon anode compartment (comprised of carbon fuel 205 and an electrolyte-filled cul-de-sac 209), a gas-impervious porous separator melt saturated 207, a bipolar cell transfer plate 208, and $CO_2$ exhaust channels 210.

The systems 100 and 200 of the present invention are also useful in the design of primary batteries, where $CO_2$ transport through the effusion plate limits contact of the carbon dioxide with the unpolarized surfaces of a rigid plate anode, and also provides a means for exhausting the carbon dioxide product from the cell.

The systems 100 and 200 of the present invention use an effusion plate to exhaust $CO_2$ from the reacting surfaces. The systems 100 and 200 of the present invention include placement of a gas-permeable but molten-salt wetted effusion plate with open, gas-filled pores between the carbon anode current collector and the gas-impermeable separator. The wetted effusion plate conducts ions between the carbon surface and the gas-impermeable salt-saturated separator. The pores of the effusion plate connect with channels exiting the cell to allow exhaust of the $CO_2$ product from the reaction zone adjacent to the separator without flow through or by the remainder of the fuel in the system.

The effusion plate is typically an open-foam ceramic, but may be rendered electronically conductive by surface deposition of a metal or by fabrication out of metal foam, and support part of the function of the anode current collector, as well. However, the primary functions of the effusion plate are (A) provide an open porosity for the transport of gaseous $CO_2$ from point of origin at the carbon/anode current collector interface and (B) provide a surface wetted with molten carbonate electrolyte to complete the electrolyte circuit between the anode and the separator electrolytes.

This configuration shown in FIG. 1 assumes that the anode is on top of the separator. The invention also functions if the anode underlies the separator, as shown in FIG. 2. In the configuration of FIG. 2, the carbon particles float to the surface of the mixed carbonate electrolyte melt in the electrolyte-filled cul-de-sac. The carbon dioxide is evolved from the overlying surface and flows through the effusion plate to the connecting channels.

Density of sodium carbonate is 2.53 g/cm³, while that of potassium carbonate is 2.428 g/cm³. The density of graphite is 2.25 g/cm³, while the disordered porous fuel particles or pellets will have gas-filled voids rendering them even lighter. Consequently, in any fluid bed of carbonate, the fuel will tend to float.

The anode current collector shown in FIGS. 1 and 2 provides the same function of the effusion plate to some degree by allowing the effusion of carbon dioxide from the reacting surfaces to the connecting channels, but is limited in this function because it is preferably thin and may not have sufficient numbers of connecting open channels parallel to the surface of the anode. The anode current collector is typically an open-pore, two-dimensional structure of minimum thickness, such as expanded metal sheet or Exmet.

Figure 3:
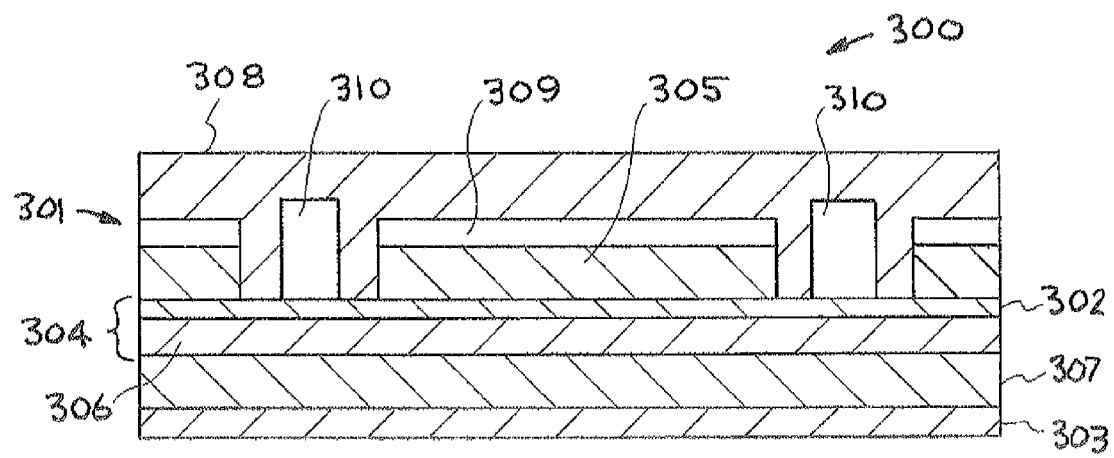
FIG. 3 illustrates the use of parallel electronic conductors in the form of an open mesh of corrosion-resistant metal or high-fired graphite open foam that extends the region of polarization into the interior of the carbon fuel paste, allowing sufficient current flow to increase polarization of the anode fuel to offset the tendency towards Boudouard corrosion.

Referring now to FIG. 3 another embodiment of the present invention illustrates and extension of the invention using a three-dimensional anode potential clamp. This embodiment of a system of the present invention is designated generally by the reference numeral 300. FIG. 3 shows the use of parallel electronic conductors in the form of an open mesh of corrosion-resistant metal or high-fired graphite open foam of low solid fraction extending the region of polarization into the interior of the carbon fuel paste, allowing sufficient anode polarization resulting in local current flow to offset the tendency towards Boudouard corrosion.

As a further refinement of the invention, the anode current collector is extended into the interior of the carbon paste or slurry electrode to provide a system for polarization of the carbon farther from the separator. This will protect the anode interior from reaction with ambient $CO_2$ by the Boudouard reaction (Equation 1) by maintaining a strong polarization of the anode far from the separator. While the use of such three-dimensional open current collectors is common, it is normally designed to minimize the IR drop in the anode, by bringing more of the anode paste into close contact with the current collector. In the present invention, however, the current collector is designed to provide polarization to the outlying regions of the anode, and not only electronic current collection. Hence, the three dimensional electronic conductor needs be designed merely to fix the potential of the anode far from the separator at a potential that inhibits the Boudouard reactions. Because the mass of the current collector extension may be very small yet provide for clamping the potential of the carbon paste at a polarization minimizing Boudouard corrosion, the current collector does not occlude a significant part of the anode surface. A mass of current collector for this clamp will be typically 1-5% of the mass of the carbon it is protecting.

The embodiment of the present invention illustrated in FIG. 3 is a carbon fuel cell section with overlying carbon fuel compartments (comprised of carbon plate or paste fuel 305 and gas-filled cul-de-sac 309) separated by open channels 310 for carbon dioxide exhaust. Carbon dioxide forming near to the interface between carbon plate or fuel paste 305 and current collector 302 flows through the collector 302 and a permeable separator 306 beneath it to the parallel channels 310. The system 300 includes a housing 301, said anode compartment, a cathode catalyst and porous current collector 303, a porous separator system 304, a carbon plate or fuel paste 305, a gas-permeable but molten-salt wetted effusion matrix 306, a gas-impermeable salt-saturated separator 307, a Bipolar cell transfer plate 308, a CO-filled cul-de-sac 309, $CO_2$ exhaust channels 310 and electronic conductors embedded within the anode fuel 311.

The system 300 utilizes a gas-permeable but molten-salt wetted effusion plate 306 operatively located and connected to the carbon anode current collector 302 and the gas-impermeable separator 307. The wetted effusion plate 306 conducts ions between the carbon surface and the gas-impermeable salt-saturated separator 307. The pores of the effusion plate connect with channels exiting the cell to allow exhaust of the $CO_2$ product to gas exhaust channels 310 from the reaction zone adjacent to the separator without flow through or by the remainder of the fuel in the system.

The effusion plate 306 is typically an open-foam ceramic, but may be rendered electronically conductive by surface deposition of a metal or by fabrication out of metal foam, and support part of the function of the anode current collector, as well. The primary functions of the effusion plate 306 are (A) provide an open porosity for the transport of gaseous $CO_2$ from point of origin at or near to the carbon/anode current collector interface and (B) provide a surface wetted with molten carbonate electrolyte to complete the electrolyte circuit between the anode and the separator electrolyte and the cathode catalyst and current collector.

The present invention provides an electrochemical cell that can operate as either a fuel cell or a battery. Fuel cells are characterized by having a fixed cell hardware that is capable of consuming fuel supplied to the cell from an external source; the rated power and energy capacity of fuel cells are, by definition, fully independent parameters. Batteries, in contrast, have their electrochemical reactants supplied in advanced of discharge and are limited in power and energy content simultaneously by the initial charge.

Figure 4:
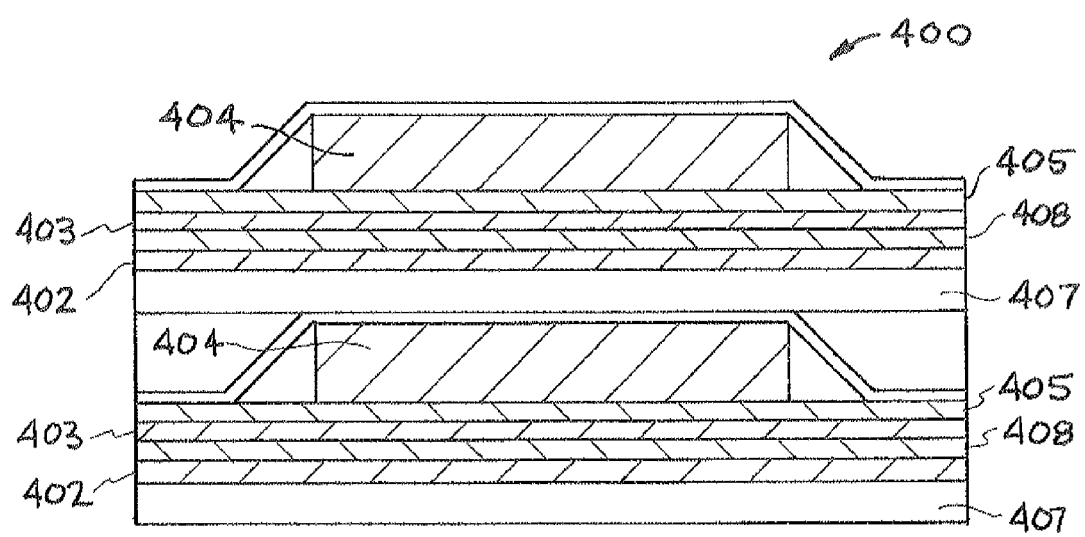
FIG. 4 illustrates that the effusion matrix may be applied to a primary battery.

Batteries are being developed that do not use pastes or slurries of carbon anode material but rather rigid plates of carbon which have various degrees of porosity. This is illustrated in FIG. 4. The embodiment of a system of the present invention illustrated in FIG. 4 is designated generally by the reference numeral 400. The system 400 includes a gas-impervious melt-saturated effusion matrix 403, perforated plate 402, carbon fuel anode plate 404, rib 406, air flow channel 407, and air cathode catalyst and current collector layer 408. A carbon fuel anode plate 404 is contained between a flexible foil of silver 405 and the assembly comprised of perforated plate, air cathode catalyst and current collector layer, and gas-impervious melt-saturated effusion matrix 403.

The gas-impervious melt-saturated effusion matrix 403 may be applied to a primary battery. Here, the gas-impervious melt-saturated effusion matrix 403 is an open pore ceramic separating the carbon fuel anode plate {a rigid block) from the separator that is fully saturated with molten salt and hence impervious to gas flow. In this cell, the anode is contained between a flexible foil of silver and the assembly of perforated plate, air cathode catalyst and current collector, separator, and effusion matrix.

Figure 5:
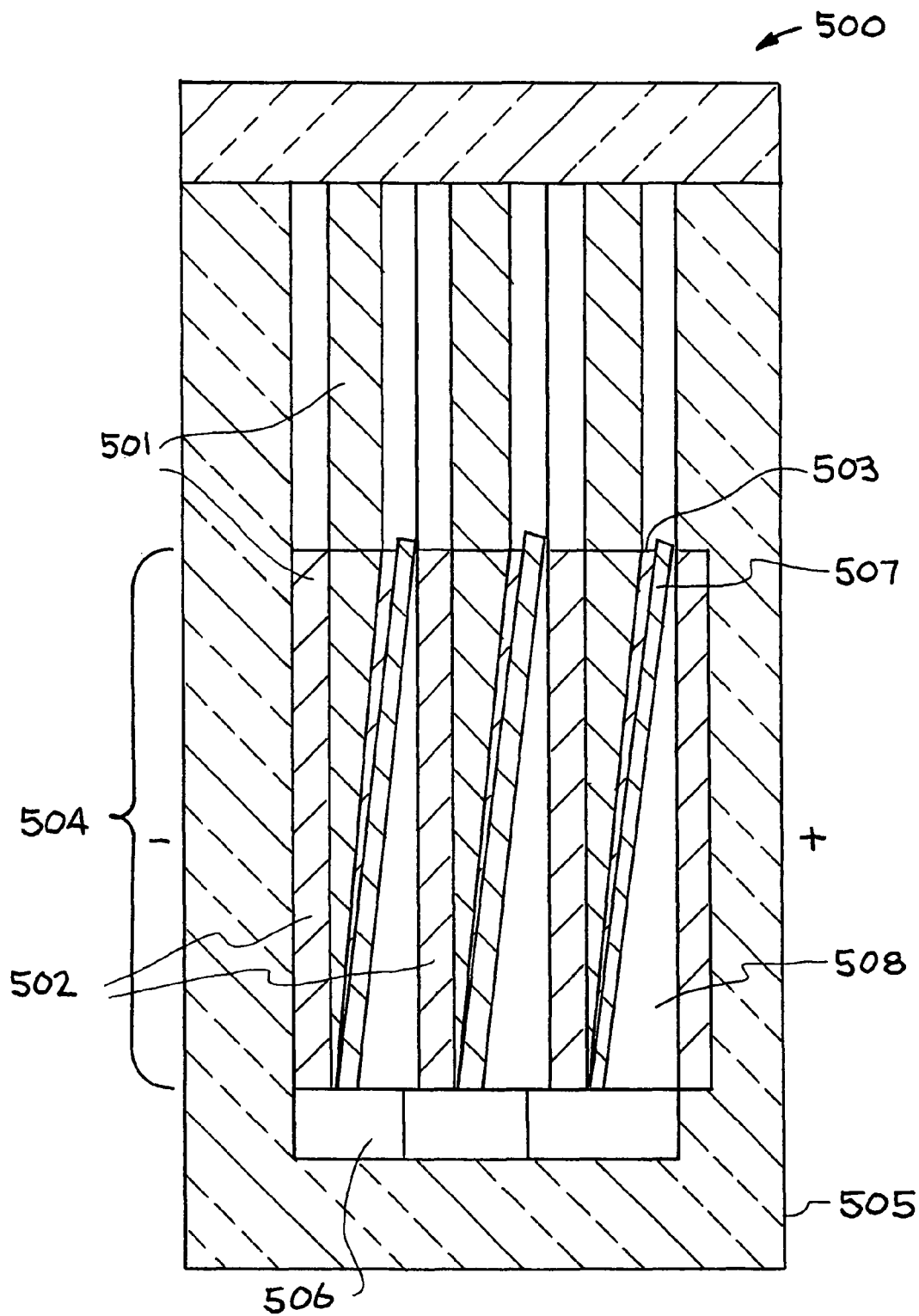
FIG. 5 illustrates a fuel cell embodiment of the present invention.

The present invention is applicable to both batteries and fuel cells using rigid plates. Fuel cells may use rigid plates of carbon. This is illustrated in FIG. 5. FIG. 5 shows a fuel cell having a tapered rigid plate anode benefits from the subject invention by use of the effusion plate between the porous gas-impervious melt-saturated separator and the reacting anode surface and provides a route for transport of the carbon dioxide gas from the reacting sites to channels exiting the cell.

The embodiment of the invention illustrated in FIG. 5 is a fuel cell designated generally by the reference numeral 500. The fuel cell 500 includes rigid fuel plates 501, bipolar plate 502, effusion plates 503, bipolar electrode array 504, thermal shields & insulation 505, sump with excess electrolyte 506 separator/catalyst/cathode assembly 507, supported by an air channel and cathode support structure 508 in functional contact with bipolar plates 502.

The main difference between the use of the rigid plate and the use of carbon fines is that a separate current collector is obviated in the rigid plate cells. Current is conducted through the body of the carbon plate from the reacting interface (i.e., next to he separator) to the opposite wall of the cell, where it is in contact with a metallic conductor bipolar plate to carry the current to the adjacent cell.

This kind of configuration (where current flows at right angle to the reacting surface) is called "bipolar configuration" as the anode (or negative) of one cell is shorted directly to the cathode (or positive electrode) of the adjacent cell allowing the cells to be connected in electrical series. This bipolar configuration minimizes the internal electronic resistance of the battery and avoids the very large IR drops associated with current collectors that must exit the cell.

In all configurations described, the cathode is represented by a cathode catalyst layer and porous cathode current collector. Many variations on the cathode are possible and consistent with and benefited by this invention.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An electrochemical cell apparatus that can operate as a fuel cell, the electrochemical cell producing carbon dioxide; comprising:
   a housing;
   a bipolar plate in said housing;
   a cathode current collector in said housing, said cathode unit including a cathode catalyst and current collector;
   an anode current collector in said housing operatively connected to said cathode current collector and said bipolar plate;
   a carbon fuel cell unit in said housing operatively connected to said anode current collector and said bipolar plate, said carbon fuel cell section including carbon fuel;
   an effusion plate in said housing positioned adjacent said anode current collector, said effusion plate allowing the passage of the carbon dioxide; and
   carbon dioxide exhaust channels in the electrochemical cell positioned adjacent said anode current collector, said carbon dioxide exhaust channels operatively connected to said effusion plate to direct the carbon dioxide from the electrochemical cell.

2. The electrochemical cell apparatus that can operate as a fuel cell of claim 1 wherein said anode current collector has two sides, a first side and second side, and said effusion plate is positioned on said first side of said anode current collector and said carbon dioxide exhaust channels are positioned on said second side of said anode current collector.

3. The electrochemical cell apparatus that can operate as a fuel cell of claim 1 wherein said effusion plate is a gas-permeable effusion plate.

4. The electrochemical cell apparatus that can operate as a fuel cell of claim 1 wherein said effusion plate is a gas-permeable molten-salt wetted effusion plate.

5. The electrochemical cell apparatus that can operate as a fuel cell of claim 1 including a gas-impermeable separator operatively connected to said anode current collector, said effusion plate, and said cathode current collector to prevent the carbon dioxide from reaching said cathode current collector.

6. The electrochemical cell apparatus that can operate as a fuel cell of claim 1 including electronic conductors in said carbon fuel cell section.

* * * * *